June 27, 1967    G. ROEHLIG ETAL    3,327,348
PLASTIC MELT EXTRUDER
Filed Oct. 4, 1965

INVENTORS
Guenter Roehlig &
Guenter Augustin
BY
ATTORNEY

United States Patent Office 3,327,348
Patented June 27, 1967

3,327,348
PLASTIC MELT EXTRUDER
Guenter Roehlig, Remscheid-Lennep, and Guenter Augustin, Ennepetal-Rueggeberg, Germany, assignors to Barmer Maschinenfabrik Aktiengesellschaft, Wuppertal-Oberbarmen, Germany
Filed Oct. 4, 1965, Ser. No. 492,518
Claims priority, application Germany, Nov. 6, 1964,
B 79,227
6 Claims. (Cl. 18—12)

This invention relates to an extruder for processing thermoplastics. In particular, this invention relates to a screw extruder for processing molten plastics which has an entrance pocket in the filling zone of the screw.

Prior to this invention, screw extruders had been employed to process warm, plastic materials in the semi-plastic state, wherein the materials were fed into the extruder in the form of ribbons or films. No particular difficulty was encountered in feeding the semi-molten plastics and in building up the necessary pressure for conveyance and extrusion of the materials with screw extruders of the conventional type. To facilitate processing of the semi-plastic materials, the filling port of the extruder had also been provided with a widened area in the screw casing or jacket, the widened area extending circumferentially around the screw.

The problems encountered in feeding molten plastics, for example having a honey-like consistency, directly to screw exteruders have been entirely different. The molten plastics offer only a small resistance to the screw threads, and the threads are unable to seize and compress the fluid plastic. Previously known feed openings to screw extruders were found to be inadequate to aid in feeding the fluid plastic and to facilitate complete filling of the screw threads with the material.

It is one object of this invention to provide a screw extruder for processing molten plastics which can be made from conventional screw extruders with a minimum of alteration thereof.

It is another object of this invention to provide a screw extruder for processing molten plastics which provides complete filling of the extruder screw threads and sufficiently high extrusion pressures to insure satisfactory and reliable processing of the fluid plastics.

It is still another object to provide a screw extruder for processing molten plastics which has an entrance pocket extending in the axial direction of the screw cylinder for at least the length of the simple screw pitch, which pocket has the largest cross-sectional area adjacent the feed inlet and a gradual reduction of cross-sectional area in the direction of the extruder outlet away from the feed inlet.

Figure 1:
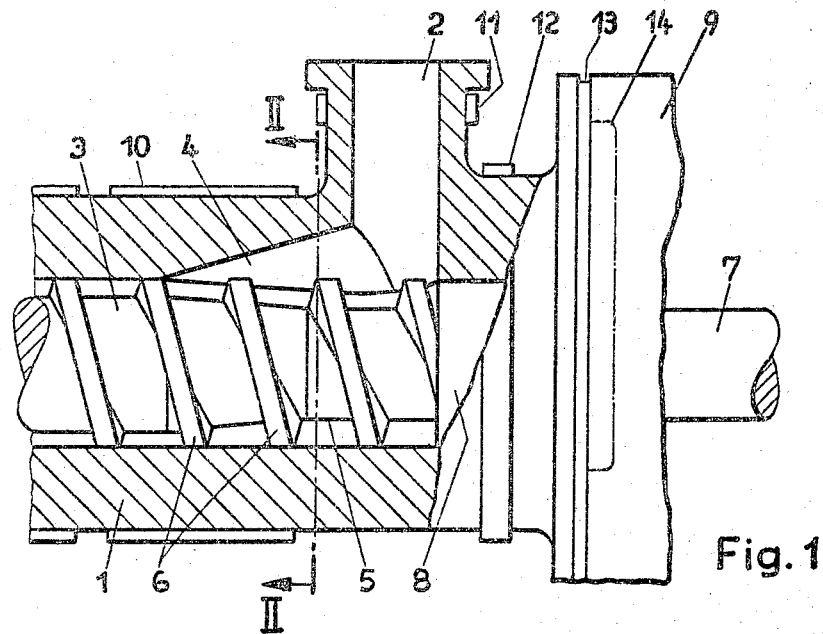

These and other objects and advantages of the invention, as well as the details of an illustrative embodiment, will be more fully understood from the following detailed description of the drawings, in which:

FIG. 1 is a longitudinal section through the feed inlet zone and the portions of the extruder adjacent thereto.

Figure 2:
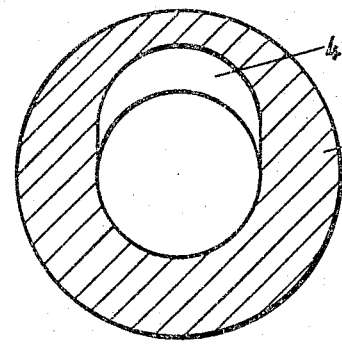
Figure 3:
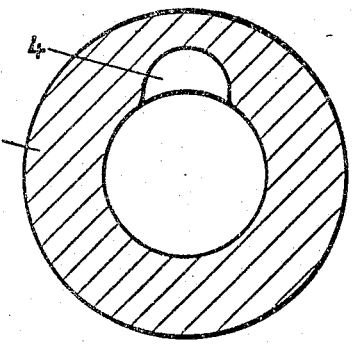
Figure 4:
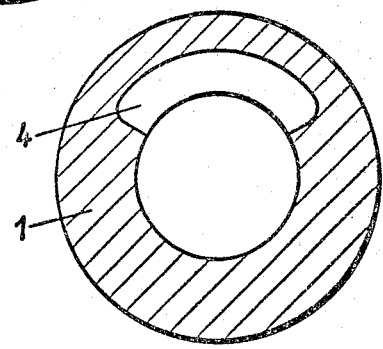

FIG. 2, FIG. 3, and FIG. 4 are sections taken along line II—II of FIG. 1 which show three alternative shapes for the feed pocket of the screw extruder of this invention.

In the screw extruder of this invention, an entrance pocket is provided in the closed part of the screw jacket, disposed in the axial direction of the screw cylinder and beginning at the feed inlet opening of the screw jacket. The pocket has its largest cross-sectional area adjacent the feed inlet opening and extends axially for at least the length of a simple screw pitch.

Referring to FIG. 1, the extruder screw 3 is disposed in the screw jacket or cylinder 1. The material feed inlet or chute 2 communicates with the screw space at the inlet end of the screw cylinder. The inner surface of the screw jacket 1 defines a pocket means 4 extending from the feed inlet 2 axially away therefrom toward the extruder outlet. The radial distance from the edge of the screw thread to the surface of the pocket means decreases constantly from adjacent the feed inlet means in the direction away therefrom.

FIG. 2, FIG. 3, and FIG. 4 are alternative sectional views of the screw jacket and pocket (the extruder screw is omitted) taken along the line II—II of FIG. 1. In FIG. 2 an embodiment of the pocket is shown wherein the sides of the pocket are tangential with respect to the walls of the screw cylinder, and the tangential sides are joined with a portion of a circle. FIG. 3 shows an embodiment of the pocket means wherein the pocket has the cross-sectional shape of a portion of a circle. FIG. 3 shows an embodiment of the pocket wherein the cross-sectional shape of the pocket is a crescent.

The width, radial depth or height, length, and inclination angle of the axial entrance pocket can be specially adapted to the viscosity of the molten plastic being processed. For very fluid materials, a pocket having a maximum width of only 60 to 90 radial degrees about the screw cylinder might be employed. For highly viscous materials, a greater width up to about 180 degrees about the screw cylinder is preferred. Particularly when the wider pockets are employed, the cross-sectional shape of the pocket of a crescent such as shown in FIG. 4 has been found preferable for technical processing reasons. However, other shapes such as those shown in FIG. 2 and FIG. 3 can be employed.

The pocket is shown preferably centrally disposed above the extruder screw as shown in the figures. However, the pocket can also be slightly displaced laterally from the central position. It cannot, however, be displaced 90° or 180°, in which positions it would no longer be effective.

The length of the pocket is also very important. The pocket should extend over a plurality of screw threads. Longer pockets are required for processing more fluid materials. As shown in FIG. 1 the walls of the pocket are inclined with respect to the screw axis. The cross-sectional area of the pocket should preferably diminish from adjacent the feed inlet opening in the axial direction away therefrom toward the extruder outlet. The height or radial depth of the pocket should decrease in the direction away from the feed inlet. The reduction of the cross-sectional area of the pocket is derived from having the walls thereof inclined or at an angle with respect to the axis of the screw. The inclined surface of the pocket should be smooth and uninterrupted with abrupt angles or steps. When deep pockets are employed extending over a plurality of screw threads, it is preferred that the radial depth and width of the pocket decrease constantly in the axial direction away from the feed inlet.

It has been found that the fluid plastic materials conveyed by the initial screw threads into the axial entrance pocket are, under the wedge action of the pocket wall or surface, pressed into the screw threads. Plastic material swept aside at the cylinder wall is pressed into the preceding screw thread segment, filling the space between the threads. In the pocket the material flow adapted to the inclined surface of the pocket has a force transverse to the screw axis. The material in the pocket is replaced with new material as it is constantly depleted.

As the pocket 4 is lengthened, a greater number of screw threads are able to seize the fluid plastic simultaneously, conveying it into the pocket space, and producing the pressure necessary for extruding the mass. The wall of the pocket exerts a wedge action on the fluid plastic, pressing it into the filled threads. Excess material is swept aside into the preceding screw thread spaces, thereby insuring a complete filling of the spaces between the screw threads. By extending the pocket over a plurality of screw threads, even very thin fluid plastics can be processed expediently.

Referring to the further details of the apparatus shown in FIG. 1, the extruder screw comprises a screw core 5, screw threads 6, and screw drive shaft 7. Packing sleeve 8 seals the space between the screw shaft and the screw housing. A retaining spring or key can be employed to prevent rotation of the packing in the housing. The screw shaft is provided with retainer means in the extruder gear housing 9 preventing axial displacement thereof in a direction away from the extruder outlet.

The material inlet chute 2 and the portions of the screw jacket adjacent thereto are heated by heating elements 10, 11, and 12. These elements can be independently regulated to provide a controlled temperature adjacent the feed opening. Thereby, heat loss from the melt introduced into the feed opening is prevented.

Heat conduction from the material feed zone into the adjacent bearing and gear housing 9, which must be protected from extreme temperatures, is prevented by a cooling fluid passageway 14. The passageway 14 is insulated by thermal insulation 13.

Obviously many modifications and variations of the invention as hereinabove set forth can be made without departing from the essence and scope thereof, and only such limitations should be applied as are indicated in the claims.

The invention claimed is:

1. A screw extruder for the processing of molten thermoplastics comprising a plastic material feed inlet means communicating with the inlet end of a screw jacket means, an extruder screw disposed within said jacket means, and an entrance pocket means defined by the inner surface of said jacket means, said pocket extending from said feed inlet means for at least the length of the simple screw pitch in the axial direction of the screw; the largest cross section of said pocket perpendicular to the axis of said screw being at the juncture of said pocket with said feed inlet means; said pocket continuously narrowing from said juncture; said pocket being located in the upper 180° of said jacket, as measured about the axis of the screw.

2. The screw extruder of claim 1 wherein a portion of the surface of the pocket means has the shape of a segment of a circle in a section perpendicular to the screw axis.

3. The screw extruder of claim 1 wherein the pocket means has the shape of a crescent in a section perpendicular to the screw axis.

4. The screw extruder of claim 1 wherein the cross-sectional area of the pocket means in a plane perpendicular to the screw axis decreases constantly from adjacent the feed inlet means in the direction away from the feed inlet means.

5. The screw extruder of claim 4 wherein the radial distance from the edge of the screw thread to the surface of the pocket means decreases constantly from adjacent the feed inlet means in the direction away from the feed inlet means.

6. The screw extruder of claim 5 wherein the width of the pocket means decreases constantly from adjacent the feed inlet means in the direction away from the feed inlet means.

References Cited

UNITED STATES PATENTS

| | | |
|---|---|---|
| 1,226,642 | 5/1917 | Demovitsch. |
| 2,295,823 | 9/1942 | Banigan et al. _____ 18—12 X |
| 2,422,722 | 6/1947 | Fielitz _____ 18—12 |
| 2,611,941 | 9/1952 | Leitl _____ 18—12 X |
| 2,796,901 | 6/1957 | Autio _____ 146—184 |

WILLIAM J. STEPHENSON, *Primary Examiner.*